(12) United States Patent
Ito et al.

(10) Patent No.: US 12,009,122 B2
(45) Date of Patent: Jun. 11, 2024

(54) WIRE HARNESS INCLUDING TAPE-WRAPPING PORTION HAVING BINDING FUNCTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takaaki Ito, Mie (JP); Taiji Mochizuki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 267 days.

(21) Appl. No.: 17/625,764

(22) PCT Filed: Jun. 29, 2020

(86) PCT No.: PCT/JP2020/025455
§ 371 (c)(1),
(2) Date: Jan. 9, 2022

(87) PCT Pub. No.: WO2021/010146
PCT Pub. Date: Jan. 21, 2021

(65) Prior Publication Data
US 2022/0277869 A1    Sep. 1, 2022

(30) Foreign Application Priority Data
Jul. 16, 2019   (JP) .................... 2019-130922

(51) Int. Cl.
  H01B 7/40    (2006.01)
  B60R 16/02   (2006.01)
  H01B 7/00    (2006.01)

(52) U.S. Cl.
  CPC ....... *H01B 7/0045* (2013.01); *B60R 16/0215* (2013.01); *H01B 7/40* (2013.01)

(58) Field of Classification Search
  CPC ...... H01B 7/0045; H01B 7/40; B60R 16/0215
  (Continued)

(56) References Cited

U.S. PATENT DOCUMENTS

| 2,299,140 A | * | 10/1942 | Hanson | ................ H01B 7/0045 174/72 A |
| 6,610,929 B1 | * | 8/2003 | Motokawa | .......... B60R 16/0207 174/72 A |

(Continued)

FOREIGN PATENT DOCUMENTS

| JP | H11-155226 A | 6/1999 |
| JP | 2000-261932 A | 9/2000 |
| JP | 2010-049947 A | 3/2010 |

OTHER PUBLICATIONS

International Search Report dated Sep. 15, 2020 for WO 2021/010146 A1 (4 pages).

*Primary Examiner* — Timothy J Thompson
*Assistant Examiner* — Michael F McAllister
(74) *Attorney, Agent, or Firm* — Venjuris, P.C.

(57) ABSTRACT

It is an object of the present invention to provide a technique with which an exterior portion can be easily provided on a wire harness. The wire harness includes: a wire; and one or more types of tape wrapped around the wire, a plurality of tape-wrapping portions being provided by wrapping the one or more types of tape around a plurality of portions along the longitudinal direction of the wire, and at least one tape-wrapping portion of the plurality of tape-wrapping portions (Continued)

exhibiting a binding function and an additional function different from the binding function.

9 Claims, 8 Drawing Sheets

(58) Field of Classification Search
USPC .................. 174/21 R, 72 C, 135, 68.1, 68.3
See application file for complete search history.

(56) References Cited

U.S. PATENT DOCUMENTS

| | | | | |
|---|---|---|---|---|
| 6,674,004 | B2* | 1/2004 | Ito | B60R 16/0215 |
| | | | | 248/68.1 |
| 7,854,989 | B2 | 12/2010 | Yabe et al. | |
| 2003/0006057 | A1* | 1/2003 | Ito | B60R 16/0215 |
| | | | | 174/68.3 |
| 2003/0217864 | A1* | 11/2003 | Ishikawa | H01B 7/0045 |
| | | | | 174/135 |
| 2007/0173156 | A1* | 7/2007 | Kulper | B32B 25/10 |
| | | | | 442/293 |
| 2009/0101269 | A1* | 4/2009 | Pfaff | C09J 7/21 |
| | | | | 156/60 |
| 2010/0236827 | A1* | 9/2010 | Doi | H02G 3/0481 |
| | | | | 174/72 A |
| 2011/0061932 | A1* | 3/2011 | Ogawa | B60R 16/0207 |
| | | | | 174/72 A |
| 2011/0067920 | A1* | 3/2011 | Toyama | H02G 3/32 |
| | | | | 174/72 A |
| 2012/0238172 | A1* | 9/2012 | Siebert | B32B 7/12 |
| | | | | 156/185 |
| 2013/0118799 | A1* | 5/2013 | Watanabe | H02G 3/0481 |
| | | | | 174/72 A |
| 2013/0273333 | A1* | 10/2013 | Meier | C09J 7/21 |
| | | | | 428/377 |
| 2014/0048329 | A1* | 2/2014 | Yamamoto | H01B 13/01209 |
| | | | | 174/72 A |
| 2015/0037523 | A1* | 2/2015 | Zielinski | B32B 17/061 |
| | | | | 428/35.2 |
| 2016/0064120 | A1* | 3/2016 | Wakabayashi | H01B 7/0045 |
| | | | | 174/72 A |
| 2017/0025201 | A1* | 1/2017 | Wakabayashi | H01B 7/0045 |

\* cited by examiner

WIRE HARNESS INCLUDING TAPE-WRAPPING PORTION HAVING BINDING FUNCTION

CROSS REFERENCE TO RELATED APPLICATIONS

This application is a national phase of PCT application No. PCT/JP2020/025455, filed on 29 Jun. 2020, which claims priority from Japanese patent application No. 2019-130922, filed on 16 Jul. 2019, all of which are incorporated herein by reference.

TECHNICAL FIELD

The present disclosure relates to a wire harness.

BACKGROUND

In a wire harness, a protective member different from adhesive tape is provided at a portion where high protective capabilities are required. Examples of such a protective member include a sheet disclosed in Patent Document 1 and a corrugated tube disclosed in Patent Document 2, for example.

PRIOR ART DOCUMENT

Patent Document

Patent Document 1: JP 2007-128797A
Patent Document 2: JP 2000-261932A

SUMMARY OF THE INVENTION

Problems to be Solved

There is demand to be able to easily provide an exterior portion on a wire harness.

Thus, it is an object of the present disclosure to provide a technique with which an exterior portion can be easily provided on a wire harness.

Means to Solve the Problem

A wire harness according to the present disclosure includes: a wire; and one or more types of tape wrapped around the wire, wherein a plurality of tape-wrapping portions are provided by wrapping the one or more types of tape around a plurality of portions along the longitudinal direction of the wire, and at least one tape-wrapping portion of the plurality of tape-wrapping portions exhibits a binding function and an additional function different from the binding function.

Effect of the Invention

With the present disclosure, an exterior portion can be easily provided on a wire harness.

DETAILED DESCRIPTION TO EXECUTE THE INVENTION

Figure 1:
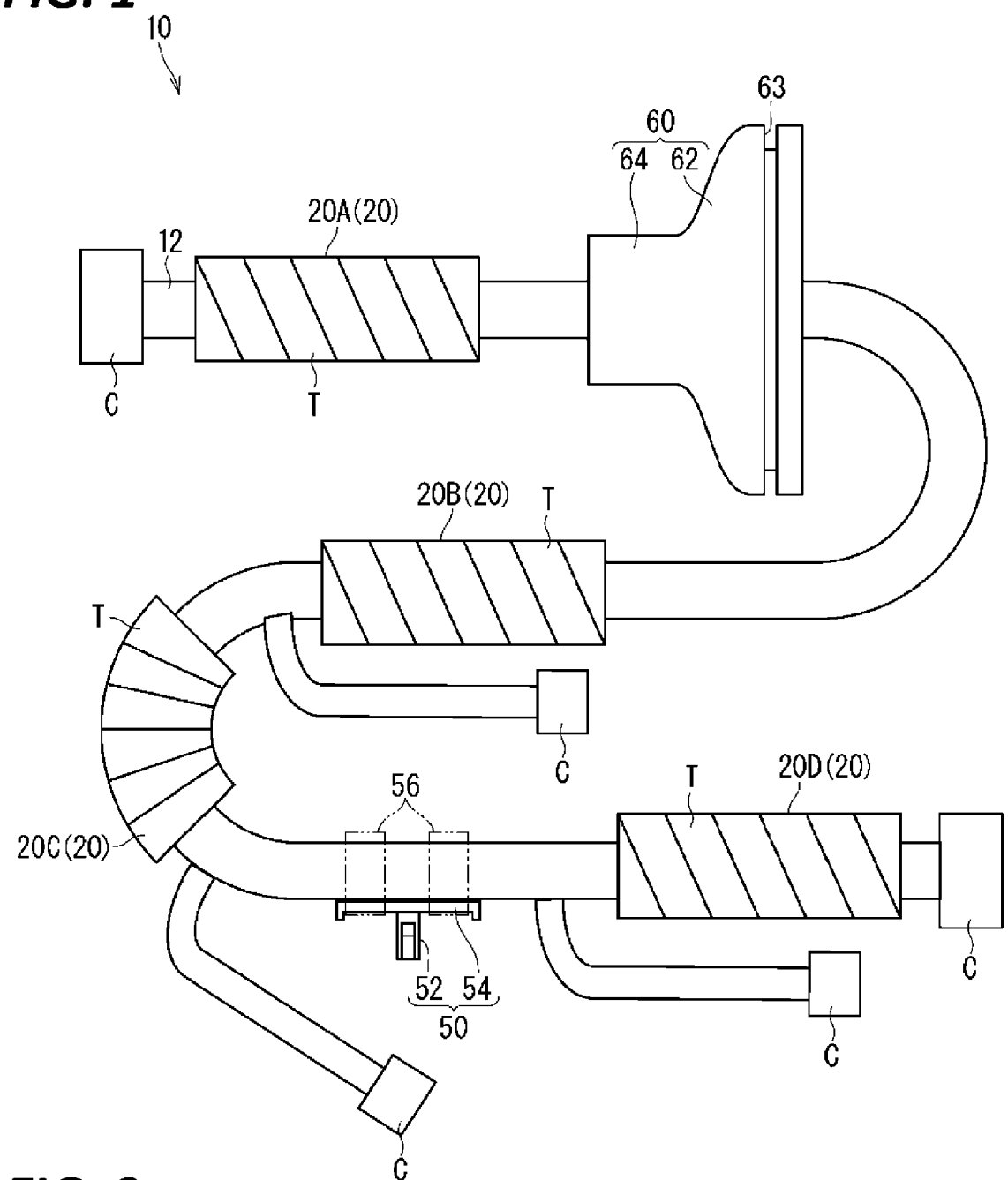
FIG. 1 is a plan view showing a wire harness according to an embodiment.

Description of Embodiments of the Present Disclosure

First, embodiments of the present disclosure will be listed and described.

The wire harness of the present disclosure is as follows.

(1) A wire harness including: a wire; and one or more types of tape wrapped around the wire, wherein a plurality of tape-wrapping portions are provided by wrapping the one or more types of tape around a plurality of portions along a longitudinal direction of the wire, and at least one tape-wrapping portion of the plurality of tape-wrapping portions exhibits a binding function and an additional function different from the binding function. As a result of the tape-wrapping portions that exhibit a binding function and an additional function fulfilling the role of a sheet, a tube, or the like, a sheet, a tube, or the like can be omitted. Also, the tape-wrapping portions are provided by wrapping tape. Thus, an exterior portion can be easily provided on the wire harness.

(2) The additional function may be at least one selected from a protective function for protection against nearby metal members, a sound-proofing function, and a path regulating function. Accordingly, an exterior portion that exhibits the protective function for protection against nearby metal members, the sound-proofing function, and the path regulating function can also be easily provided on the wire harness.

(3) The plurality of tape-wrapping portions may include a first function tape-wrapping portion that exhibits a first additional function as the additional function and a second function tape-wrapping portion that exhibits a second additional function that is different from the first additional function as the additional function. Accordingly an exterior portion that exhibits a plurality of additional functions can also be easily provided on the wire harness.

(4) Tape of the first function tape-wrapping portion and tape of the second function tape-wrapping portion may be different types of tape, and horizontal wrapping may be employed as a wrapping method of the tape of the first function tape-wrapping portion and a wrapping method of the tape of the second function tape-wrapping portion. Thus, the first function tape-wrapping portion and the second function tape-wrapping portion can be easily formed.

(5) The plurality of tape-wrapping portions may include a first wrapping method portion and a second wrapping method portion in which the same type of tape is wrapped using different wrapping methods. Accordingly, tape-wrapping portions having varying functions are provided by one type of tape.

(6) The wire harness may further include an exterior member attached to the wire, wherein the exterior member may be a different member from the one or more types of tape, and only a vehicle fixing member and a grommet or only one of the vehicle fixing member and the grommet may be provided as the exterior member. Accordingly, exterior components excluding the tape, the vehicle fixing member, and the grommet can be omitted.

Details of Embodiments of the Present Disclosure

Specific examples of a wire harness of the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment

A wire harness according to an embodiment is described below. FIG. 1 is a plan view showing a wire harness 10 according to an embodiment. Note that, due to limitations of the sheet, the wire harness 10 is shown in a bent state in FIG. 1.

The wire harness 10 is a wiring member for electrically connecting electrical components installed in a vehicle. The wire harness 10 includes a wire 12 and one or more types of tape T wrapped around the wire 12.

The wire 12 is a coated wire in which an insulating coating is formed around a core wire. The core wire is made of copper, aluminum, a copper alloy, or an aluminum alloy. The core wire may be made of a single wire member, or may be a stranded wire in which a plurality of wire strands are twisted together. The insulating coating is made of a resin such as PVC, polyethylene, and fluorocarbon resin. This wire 12 has the function of transmitting electric signals, electric power, or the like.

It is sufficient that the wire harness 10 has at least one wire 12. Here, the wire harness 10 is provided with a plurality of wires 12. The wires 12 may all have the same outer diameter, or include wires 12 with different outer diameters. A connector C may be provided at an end portion of the wires 12.

Each connector C is a resin housing that houses an end portion of a wire 12. For example, a terminal is connected to an end portion of a wire 12. This terminal is housed and held in a cavity formed in the housing. When the connector C is connected to a partner connecter, the terminal in the connector C is connected to a terminal in the partner connecter.

A plurality of wires 12 are branched at intermediate positions of the wire harness 10, and end portions thereof are respectively housed in a predetermined housing. Accordingly, the wire harness 10 is formed in a shape that corresponds to the wiring form of the wires 12 in the vehicle.

One or more types of tape T are wrapped around a plurality of portions along the longitudinal direction of the wires 12. Each portion wrapped in the tape T forms a tape-wrapping portion 20. Thus, the wire harness 10 includes a plurality (four in the example shown in FIG. 1) of tape-wrapping portions 20. Below, the four tape-wrapping portions 20 shown in FIG. 1 may be referred to as a tape-wrapping portion 20A, a tape-wrapping portion 20B, a tape-wrapping portion 20C, and a tape-wrapping portion 20D, when differentiation therebetween is required.

At least one tape-wrapping portion 20 of the tape-wrapping portions 20 exhibits a binding function and an additional function different from the binding function. The tape-wrapping portions 20 may include tape-wrapping portions 20 with different additional functions to each other. That is, the tape winding functions 20 may include a first function tape-wrapping portion and a second function tape-wrapping portion. The first function tape-wrapping portion exhibits a first additional function as the additional function. The second function tape-wrapping portion exhibits a second additional function different from the first additional function, as the additional function.

Additional Function of Tape-Wrapping Portion

Possible additional functions include, for example, a protective function for protection against nearby metal members, a sound-proofing function, and a path regulating function, for example. One tape-wrapping portion 20 may exhibit one additional function, or exhibit a plurality of additional functions. At least one additional function may be selected from the protective function for protection against nearby metal members, the sound-proofing function, and the path regulating function.

The protective function for protection against nearby metal members is a function for protecting the wire harness 10 from metal members located near the wire harness 10, when attaching the wire harness 10 to a vehicle, or when the wire harness 10 is attached to a vehicle. With the protective function for protection against nearby metal members, normally, higher protective capabilities are required compared to a case where binding tape T is half-lap wrapped. In a conventional wire harness, it is often the case that an exterior member such as a sheet, a tube, or a protector exhibits the protective function for protection against nearby metal members. In the wire harness 10 according to the present disclosure, instead of an exterior member such as a sheet or tube, the protective function for protection against nearby metal members is exhibited by a tape-wrapping portion 20.

As the protective function for protection against nearby metal members, a protective function for protection against metal surfaces and a protective function for protection against metal edges are conceivable. The protective function for protection against metal surfaces is a function for suppressing external damage to the wires 12 when interference occurs between the wire harness 10 and a metal surface. The protective function for protection against metal edges is a function for suppressing external damage to the wires 12 when interference occurs between the wire harness 10 and a metal edge. Normally, the protective function for protection against metal edges requires higher protective capabilities compared to the protective function for protection against metal edges.

The sound-proofing function is a function for preventing unusual noises from occurring when the wire harness 10 comes into contact with a member positioned nearby, in a state where the wire harness 10 is attached to a vehicle. In conventional wire harnesses, the sound-proofing function is often exhibited by an exterior member such as a non-woven fabric sheet. In the wire harness 10 of the present disclosure, the tape-wrapping portions 20 exhibit the sound-proofing function, instead of an exterior member such as a non-woven fabric sheet.

As the sound-proofing function, a hitting-sound suppressing function, a scraping-sound suppressing function, and the like can be conceived. The hitting-sound suppressing function is a function that suppresses a sound that occurs when the wire harness 10, in a state where it is separated from a nearby member, moves toward the nearby member and comes in contact with the nearby member. The scraping-sound suppressing function is a function that suppresses a sound that occurs when the wire harness 10 comes into contact with and scrapes against a nearby member.

The path regulating function is a function for keeping the shape of the wire harness 10 constant. Normally, the wires 12 constituting the wire harness 10 are flexible. Thus, it is difficult to keep the wire harness 10 in a fixed shape. In conventional wire harnesses, paths are often maintained by providing hard molded components such as a protector and a pipe on the outside of the wires 12. The wire harness 10 of the present disclosure exhibits the path regulating function due to the tape-wrapping portions 20. Accordingly, the wire harness 10 is kept in a fixed shape.

A function to be added to a plurality of the tape-wrapping portions 20 can be set as appropriate, but may also be set as described below, for example. The tape-wrapping portions 20A and 20D provided near a connector C may exhibit the protective function for protection against nearby metal members. Also, the tape-wrapping portion 20B provided at a portion such as a portion of the wire harness 10 that is loosely fixed to the vehicle body, a portion disposed to be raised away from the vehicle body, or a portion disposed so as to be movable relative to the vehicle body may exhibit the sound-proofing function. Also, for example, the tape-wrapping portion 20C provided at a portion of the wire harness 10 that is disposed bent on the vehicle body may exhibit the path regulating function.

Wrapping Method of Tape T

The tape-wrapping portions 20 may include tape-wrapping portions 20 that are wrapped different from each other. That is, the tape-wrapping portions 20 may include a first wrapping method portion and a second wrapping method portion. For the first wrapping method portion and the second wrapping method portion, different wrapping methods are used to wrap the same type of tape T.

Here, the wrapping method with which a single continuous piece of tape T is wrapped around the wires 12 will be described.

The wrapping method in which a single continuous piece of tape T is wrapped around the wires 12 is largely classified as horizontal wrapping and vertical wrapping. Horizontal wrapping is a wrapping method in which the longitudinal direction of the tape T is along the circumferential direction of the wires 12. Vertical wrapping is a wrapping method in which the longitudinal direction of the tape T is along the longitudinal direction of the wires 12.

Furthermore, the horizontal wrapping is largely classified into a wrapping method where the tape T is wrapped while the adhering region thereof is shifted along the longitudinal direction of the wires 12, and a wrapping method where the tape is wrapped without the adhering region thereof being shifted along the longitudinal direction of the wires 12. In the case of the former, the tape T wrapped around the wires 12 is passed around the wires 12 while shifting position along the longitudinal direction of the wires 12, in the shape of a spiral. In the case of the latter, the tape T wrapped around the wires 12 is passed around the wires 12 at a fixed position along the longitudinal direction of the wires 12, in the shape of a coil. Below, in the present specification, the former wrapping method is referred to as spiral wrapping, and the latter wrapping method is referred to as fixed-position wrapping.

Furthermore, the spiral wrapping is largely classified into a wrapping method where a portion in the width direction of the tape T is overlapped when the tape T makes more than one lap around the wires 12, and a wrapping method where the tape T is not overlapped in the width direction when the tape T makes more than one lap around the wires 12. In the case of the former, properties such as protection and water-proofing are improved because there are no gaps in the tape T along the longitudinal direction of the wires 12. Also, the thickness of a portion where the tape T is wrapped is increased by an amount corresponding to the portion where parts of the tape T overlap. In the case of the latter, a large area can be wrapped while suppressing the amount of tape T used. Also, the thickness of the portion where the tape T is wrapped is reduced by an amount that corresponds to the absence of overlapping tape T. Below, in the present specification, the former wrapping method is referred to as overlap wrapping, and the latter wrapping method is referred to as non-lap wrapping. Also, regarding overlap wrapping, the ratio of the overlapping width of the following wrapped portion to the full width of the previously wrapped portion is referred to as a lap margin.

For example, overlap wrapping includes half-lap wrapping where half the width of the tape T is overlapped, and the like. The lap margin in half-lap wrapping is ½. Non-lap wrapping includes rough wrapping where gaps are formed between laps of the tape T in the longitudinal direction of the wires 12. Note that, in view of overlapping of the tape T, the non-lap wrapping is a wrapping method where the lap margin is zero. Also, the above fixed-position wrapping is a wrapping method where the entire width of the tape T is overlapped and the lap margin is one. Thus, the fixed-position wrapping may also be referred to as all-lap wrapping.

The relation between the lap margin and the layers of tape T in an intermediate region of an overlap wrapping portion is generalized as follows. That is, n is an integer of 2 or more. When the lap margin is (n−1) of n, the tape T has n layers in all portions of the intermediate region. When the lap margin is greater than (n−1) of n and smaller than (n+1) of n, the tape T extends in the intermediate region in a spiral shape where an n layer portion and an (n+1) layer portion are adjacent to each other. Accordingly, when the lap margin is greater than (n−1) of n, the tape T will have more than n layers in at least a portion of the intermediate region.

The portion of the tape T wrapped using a wrapping method described here can be treated as a wrapping portion that corresponds to the wrapping method thereof. For example, a spiral-wrapping portion is a portion where tape T is wrapped using spiral wrapping. Also, for example, a fixed position wrapping portion is a portion where tape T is wrapped using fixed-position wrapping.

Note that, when a continuous piece of tape T is wrapped around the wires 12, it goes without saying that the above-described wrapping methods can be combined as appropriate.

Below, specific examples of the tape-wrapping portions 20 will be described with reference to the drawings.

First Example of Tape-Wrapping Portion 20

Figure 2:
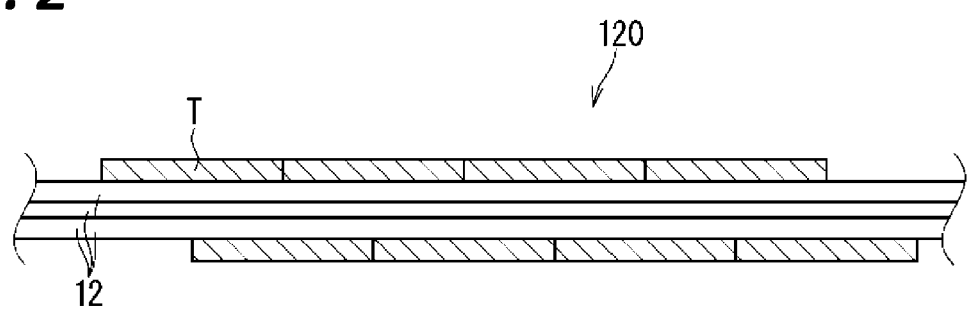
FIG. 2 is a vertical cross-sectional diagram showing a first example of a tape-wrapping portion.

FIG. 2 is vertical cross-sectional diagram showing a first example of the tape-wrapping portion 20. As shown in FIG. 2, a tape-wrapping portion 120 is a non-lap wrapping portion where the tape T is non-lap wrapped. The tape-wrapping portion 120 is a single-layer non-lap wrapping portion. The tape-wrapping portion 120 is a non-lap wrapping portion where there are no gaps between laps of the tape T. The tape-winding portion may be a non-lap wrapping portion (rough wrapping portion) where there are gaps between laps of the tape T.

Second Example of Tape-Wrapping Portion 20

Figure 3:
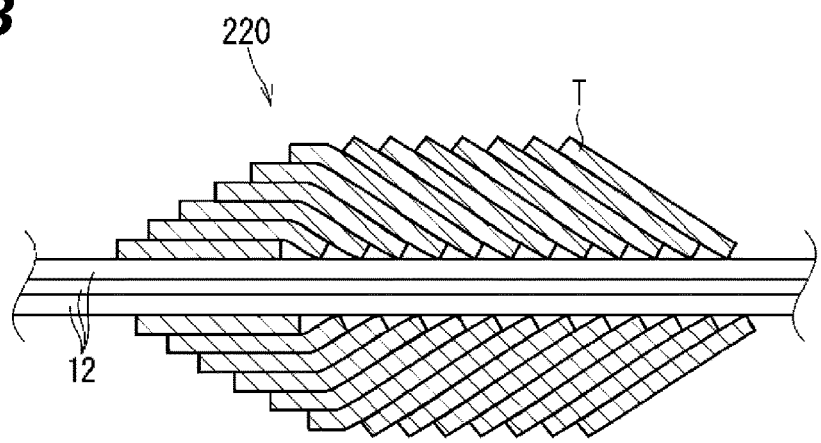
FIG. 3 is a vertical cross-sectional diagram showing a second example of the tape-wrapping portion.

FIG. 3 is a vertical cross-sectional diagram showing a second example of the tape-wrapping portion 20. A tape-wrapping portion 220 shown in FIG. 3 is an overlap wrapping portion where the tape T is wrapped using overlap wrapping. The tape-wrapping portion 220 is an overlap wrapping portion with a lap margin of ⅘. In this way, the tape-wrapping portion 220 may be an overlap wrapping portion with a lap margin greater than ½ and smaller than 1. Accordingly, in the tape-wrapping portion 220, a multi-layer portion where the tape T forms more than two layers is formed. Furthermore, the tape-wrapping portion 220 may be an overlap wrapping portion with a lap margin greater than ⅔ and smaller than 1. Accordingly, in the tape-wrapping portion 220, the tape T in the entire region of the intermediate portion, excluding the wrap-start portion and the wrap-end portion, forms 3 or more layers. Naturally, the tape-wrapping portion may be an overlap wrapping portion with a lap margin greater than 0 and smaller than ½.

The lap margin of the overlap wrapping portion may be set in view of the thickness of the tape T and the finishing thickness (thickness from the inner surface on the wires 12 side to the outer surface) of the tape-wrapping portion 220, for example. Specifically, if the thickness of the tape T is 0.1 mm and the finishing thickness of the tape-wrapping portion 220 is to be 0.5 mm, by employing the ⅘ lap margin shown in FIG. 2, the required finishing thickness of the tape-wrapping portion 220 can be obtained.

The finishing thickness of the tape-wrapping portion 220 is not particularly limited, but may be 0.5 mm or more, for example. Also, the finishing thickness may be 1.0 mm or more, for example.

Third Example of Tape-Wrapping Portion 20

Figure 4:
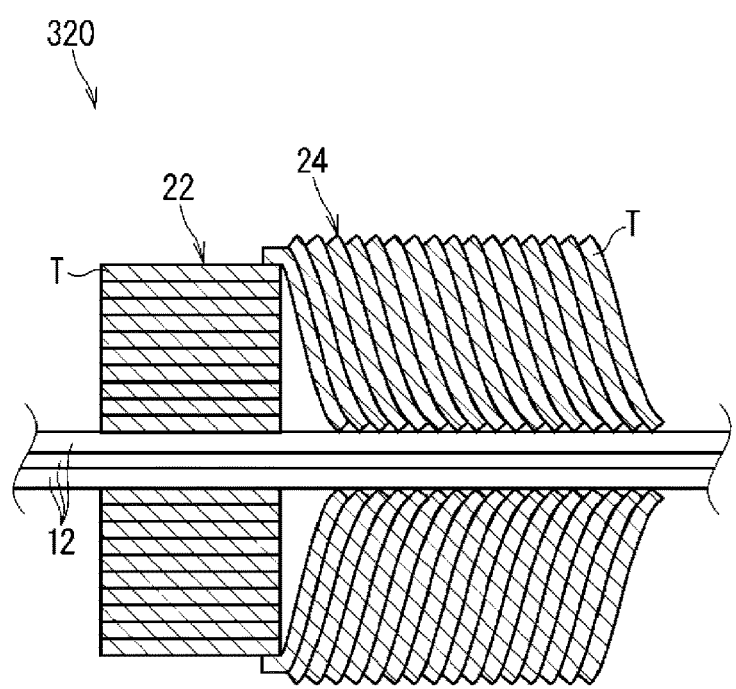
FIG. 4 is a vertical cross-sectional diagram showing a third example of the tape-wrapping portion.

FIG. 4 is a vertical cross-sectional diagram showing a third example of the tape-wrapping portion 20. A tape-wrapping portion 320 shown in FIG. 4 is a combination of a fixed-position wrapping portion 22 and an overlap wrapping portion 24.

The fixed-position wrapping portion 22 is provided at one end portion of the tape-wrapping portion 320 in the longitudinal direction of the wires 12. In the fixed-position wrapping portion 22, the tape T is wrapped at the same position to form layers.

The wrap-start portion of the overlap wrapping portion 24 overlaps the outer circumferential side of the fixed-position wrapping portion 22. The wrap-start portion of the overlap wrapping portion 24 starts on the other end portion side of the tape-wrapping portion 320 relative to the center in the width direction of the fixed-position wrapping portion 22.

The tape T of the fixed-position wrapping portion 22 and the tape T of the overlap wrapping portion 24 may be separated. That is, the tape T may be cut once the fixed-position wrapping portion 22 has been fully wrapped, and wrapping of the overlap wrapping portion 24 may be started anew. In this case, there is no need to provide a bridging portion between the fixed-position wrapping portion 22 and the overlap wrapping portion 24.

The tape T of the fixed-position wrapping portion 22 and the tape T of the overlap wrapping portion 24 may be one continuous piece. In this case, there is no need to cut the tape T once the fixed-position wrapping portion 22 has been fully wrapped. In the case where the tape T of the fixed-position wrapping portion 22 and the tape T of the overlap wrapping portion 24 is one continuous piece, it is preferable that the number of laps made at the bridging portion between the wrap-end portion of the fixed-position wrapping portion 22 and the wrap-start portion of the overlap wrapping portion 24 is as small as possible. For example, the number of laps made at the bridging portion between the wrap-end portion of the fixed-position wrapping portion 22 and the wrap-start portion of the overlap wrapping portion 24 may be smaller than one lap, and may be smaller than a half lap.

The tape-wrapping portion 320 may be employed for the tape-wrapping portions 20A and 20D, which are near connectors C. In this case, the fixed-position wrapping portion 22 may be provided in the tape-wrapping portion 20 so as to be nearest the connector C in the longitudinal direction of the wires 12. At this time, the interval between the edge portion on the connector C side of the fixed-position wrapping portion 22 and the connector C in the longitudinal direction of the wires 12 is not particularly limited and can be set as appropriate. For example, the interval between the edge portion on the connector C side of the fixed-position wrapping portion 22 and the connector C may be 0 mm or more and 10 mm or less. The case where the interval between the edge portion on the connector C side and the connector C is 0 mm is a case where the fixed-position wrapping portion 22 and the connector C are in contact with each other.

The number of laps made at the fixed-position wrapping portion 22 is not particularly limited, provided there are two or more laps, and can be set as appropriate. For example, the number of laps made at the fixed-position wrapping portion 22 may be three or more, five or more, and ten or more. The number of laps made at the fixed-position wrapping portion 22 may be set in view of the thickness of the tape T and the finishing thickness of the tape-wrapping portion 320, for example. Specifically, if the thickness of the tape T is 0.1 mm and the finishing thickness of the tape-wrapping portion 320 is to be 1.0 mm, the number of laps made at the fixed-position wrapping portion 22 can be 10 as shown in the example in FIG. 4. In this case, by making the lap margin of the overlap wrapping portion 24 9/10, the finishing thickness of the fixed-position wrapping portion 22 and the finishing thickness of the overlap wrapping portion 24 will be approximately the same.

The face of each connector C from which a wire 12 extends is a wire extension face. Normally, the wire extension face is the face in which the opening of the cavity is formed. The wire extension face has the shape of a square or a shape similar to a square. The finishing thickness of the fixed-position wrapping portion 22 may be the same as, greater than, or smaller than the length of the wire extension face in the short-side direction thereof. Also, the finishing thickness of the fixed-position wrapping portion may be the same as, greater than, or smaller than the length of the wire extension face in the long-side direction thereof.

Fourth Example of Tape-Wrapping Portion 20

Figure 5:
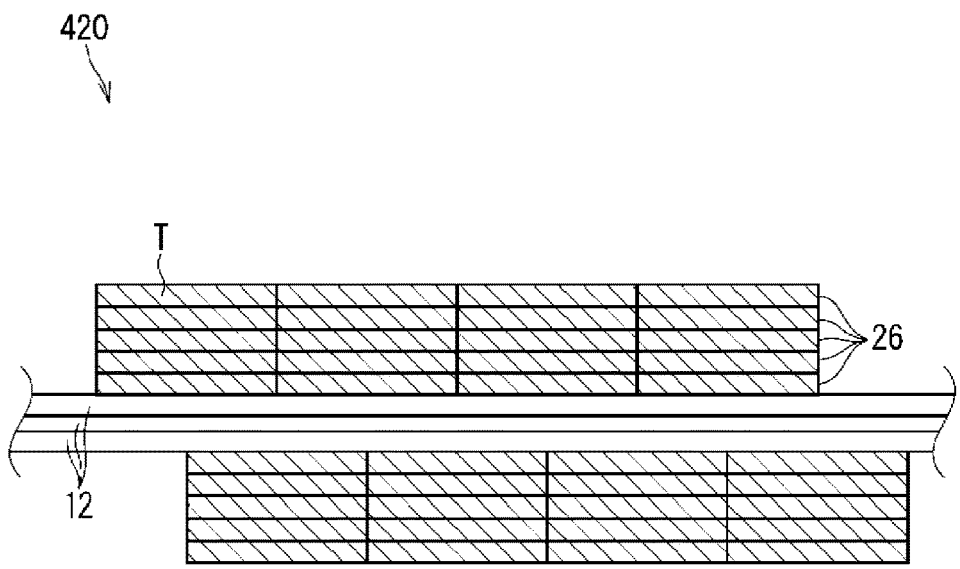
FIG. 5 is a vertical cross-sectional diagram showing a fourth example of the tape-wrapping portion.

FIG. 5 is a vertical cross-sectional diagram showing a fourth example of the tape-wrapping portion 20. A tape-wrapping portion 420 shown in FIG. 5 is provided with a plurality of overlapping spiral-wrapping portions 26 each forming a layer.

Each spiral-wrapping portion 26 forming a layer of the tape-wrapping portion 420 is a non-lap wrapping portion. Each spiral-wrapping portion 26 forming a layer in the tape-wrapping portion 420 may be an overlap wrapping portion. Below, out of two spiral-wrapping portions 26 that overlap while being in contact with each other in a thickness direction, the spiral-wrapping portion 26 layer on the inner side is an inner layer and the spiral-wrapping portion 26 layer on the outer side is an outer layer.

The tape T of the inner layer and the tape T of the outer layer may be separated. That is, the tape T may be cut once the inner layer has been fully wrapped, and then wrapping of the outer layer may be started anew. In this case, the inner layer and the outer layer can be wrapped using the same wrapping method. Accordingly, spiral orientation of the inner layer and the outer layer can be matched.

The tape T of the inner layer and the tape T of the outer layer may be one continuous piece. In this case, there is no need to cut the tape T once the inner layer has been fully wrapped. If the tape T of the inner layer and the tape T of the outer layer is one continuous piece, the spiral orientation of the inner layer is the reverse of the outer layer. Also, the wrap-start portion of the outer layer overlaps the wrap-end portion of the inner layer.

In the example shown in FIG. 5, each spiral-wrapping portion 26 forming a layer is non-lap wrapped so that no gap is formed between laps of the tape T. The spiral-wrapping portions 26 forming the respective layers may be non-lap wrapped so that no gap is formed between laps of the tape T. In this case, it is preferable that the gap in the inner layer and the gap in the outer layer do not overlap. That is, it is preferable that the tape T of the outer layer is positioned on the outer side of the gap in the inner layer, and the tape T of the outer layer covers the gap in the inner layer.

The number of layers formed by a spiral-wrapping portion 26 in the tape-wrapping portion 420 is not particularly limited, and can be set as appropriate. For example, the number of layers formed by a spiral-wrapping portion 26 may be three or more, five or more, and ten or more. The number of layers formed by a spiral-wrapping portion 26 may be set in view of the thickness of the tape T and the finishing thickness of the tape-wrapping portion 420, for example. Specifically, if the thickness of the tape T is 0.1 mm and the finishing thickness of the tape-wrapping portion 420 is to be 0.5 mm, the number of layers formed by a spiral-wrapping portion 26 can be five as shown in the example shown in FIG. 3.

Fifth Example of Tape-Wrapping Portion 20

Figure 6:
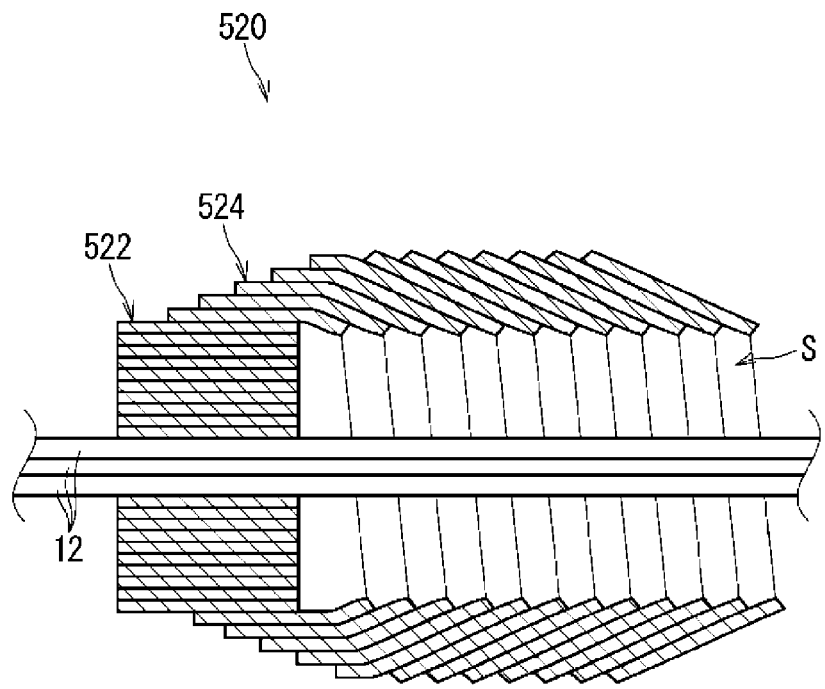
FIG. 6 is a vertical cross-sectional diagram showing a fifth example of the tape-wrapping portion.
Figure 7:
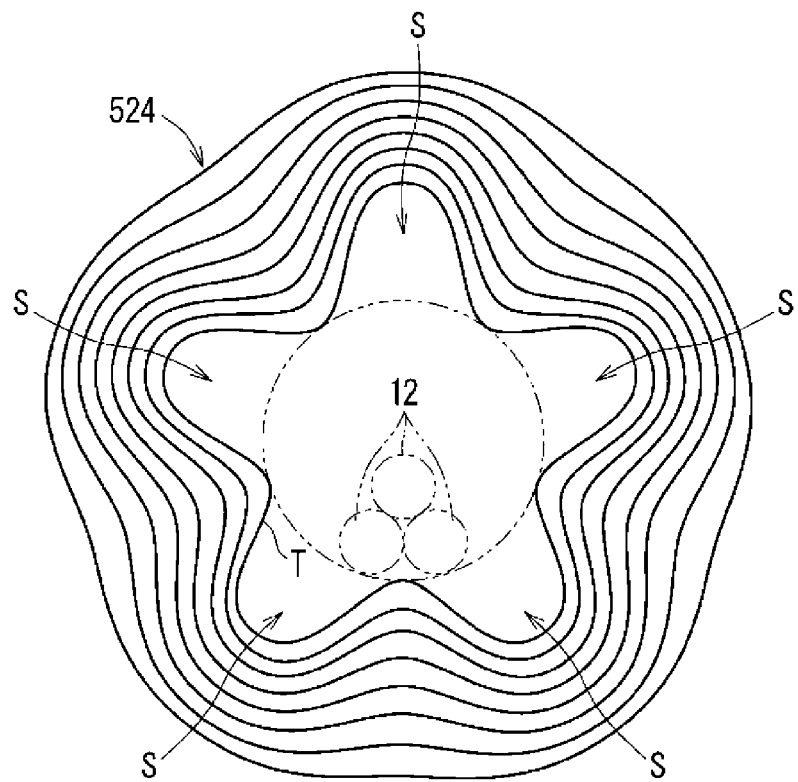
FIG. 7 is a rear view showing the fifth example of the tape-wrapping portion.

FIG. 6 is vertical cross-sectional diagram showing a fifth example of the tape-wrapping portion 20. FIG. 7 is a rear view showing the fifth example of the tape-wrapping portion 20. A tape-wrapping portion 520 according to the fifth example has a portion where the tape T is wrapped so as to form gaps (spaces) S around the wires 12. The gaps S are formed between the outer surface of the wires 12 and the inner surface of the tape-wrapping portion 520.

Here, protrusions and recessions extending along a radial direction can be lined up in a circumferential direction on the outer surface of a plurality of wire bundles in which the wires 12 are bound. If the tape T is wrapped around the wire bundle, gaps can be formed by these protrusions and recessions. However, in the present specification, the gaps S that can be formed in the tape-wrapping portion 520 are different from gaps formed by the protrusions and recessions of the above wire bundle. The gaps S formed in the tape-wrapping portion 520 are not gaps formed corresponding to the protrusions and recessions formed in the external shape of an adherend wrapped in the tape T. For example, the gaps S that can be formed in the tape-wrapping portion 20 are formed by, in at least a portion of the laps around the wires 12, winding the tape T so that the lap length thereof is longer than the lap length of the inner portion thereof. Here, when there are protrusions and recessions in the inner portion, the lap length of the inner portion refers to a lap length when the tape T is wound, under tension, into a shape that corresponds to the protrusions.

The tape-wrapping portion 520 has a fixed-position wrapping portion 522 and an overlap wrapping portion 524. The gaps S are formed in the intermediate region of the overlap wrapping portion 524.

The fixed-position wrapping portion 522 is provided at one end portion of the tape-wrapping portion 20 in the longitudinal direction of the wires 12. In the fixed-position wrapping portion 522, the tape T is wrapped at the same position to form layers.

The wrap-start portion of the overlap wrapping portion 524 overlaps the outer circumferential side of the fixed-position wrapping portion 522. The wrap-start portion of the overlap wrapping portion 524 starts on the one end portion side of the tape-wrapping portion 520 relative to the center in the width direction of the tape T of the fixed-position wrapping portion 522. Here, the wrap-start portion of the overlap wrapping portion 524 starts from the wrap-end portion of the fixed-position wrapping portion 522. That is, even at the portion of the overlap wrapping portion 524 that overlaps the fixed-position wrapping portion 522, the tape T is wrapped with the same lap margin as the portion of the overlap wrapping portion 524 that does not overlap the fixed-position wrapping portion 522.

The overlap wrapping portion 524 is gradually wrapped from the portion where it overlaps the fixed-position wrapping portion 522 to the portion where it does not overlap the fixed-position wrapping portion 522. At this time, in the overlap wrapping portion 524, the amount with which the tape T overlaps the fixed-position wrapping portion 522 is gradually reduced while the tape T is wrapped, and eventually ceases to overlap the fixed-position wrapping portion 522 at all. Below, a portion of the overlap wrapping portion 524 starting from the wrap-start portion to a portion where at least a portion of the tape T overlaps the fixed-position wrapping portion 522 is referred to as a first portion. Accordingly, the first portion includes a portion that protrudes from the fixed-position wrapping portion 522. The portion of the first portion protruding from the fixed-position wrapping portion 522 is referred to as a protruding portion. In the overlap wrapping portion 524, the portion extending from the position where the entirety of the tape T ceases to overlap the fixed-position wrapping portion 522, that is, the portion where the tape T is wrapped from the end of the first portion toward the other end side, is referred to as the second portion. Also, in the overlap wrapping portion 524, the portion that does not overlap the fixed-position wrapping portion 522 is referred to as a raised portion. The raised portion is constituted by the protruding portion of the first portion and the second portion.

In the first portion, a portion of the tape T overlaps the fixed-position wrapping portion 522. The protruding portion is supported by the fixed-position wrapping portion 522. The fixed-position wrapping portion 522 functions as a support member that supports the protruding portion. Accordingly, in the first portion, the protruding portion is likely to be kept in a state where it is raised away from the wires 12. Similarly, the second portion is raised away from the wires 12 due to the protruding portion functioning as a support member. Accordingly, the raised portion is wrapped raised away from the wires 12 across the gaps S, and the gaps S of the tape-wrapping portion 520 are formed in the raised portion.

On the end-wrap portion side of the overlap wrapping portion 524, the tape T is adhered to the wires 12 at intervals in the circumferential direction of the wires 12, as shown in FIG. 7. In the tape-wrapping portion 520, the overlap wrapping portion 524 continues as is to the wrap-end portion thereof. Here, when the raised portion becomes longer, the thus wrapped portion will be unable to support the raised portion, and a portion of the raised portion will collapse inwardly, and adhere to the wires 12. For example, if the tape T is wrapped to form the raised portion, eventually the wrapping pressure of the tape T will exceed the force supporting the raised portion. In this case, a portion of the raised portion adheres to the wires 12. When a portion of the raised portion adheres to the wires 12, the force supporting the raised portion is temporarily increased, and the tape T is wrapped with the raised portion once again supported raised away from the wires 12. By repeating this, on the end-wrap portion side of the overlap wrapping portion 524, the tape T is adhered to the wires 12 at a plurality of positions at intervals in the circumferential direction of the wires 12.

The tape T of the fixed-position wrapping portion 522 and the tape T of the overlap wrapping portion 524 may be separated. That is, the tape T may be cut once the fixed-position wrapping portion 522 has been fully wrapped, and wrapping of the overlap wrapping portion 524 may be started anew. In this case, there is no need to provide a bridging portion between the fixed-position wrapping portion 522 and the overlap wrapping portion 524.

The tape T of the fixed-position wrapping portion 522 and the tape T of the overlap wrapping portion 524 may be one continuous piece. In this case, there is no need to cut the tape T once the fixed-position wrapping portion 522 has been fully wrapped. In the case where the tape T of the fixed-position wrapping portion 522 and the tape T of the overlap wrapping portion 524 is one continuous piece, it is preferable that the number of laps made at the bridging portion between the wrap-end portion of the fixed-position wrapping portion 522 and the wrap-start portion of the overlap wrapping portion 524 is as small as possible. For example, the number of laps made at the bridging portion between the wrap-end portion of the fixed-position wrapping portion 522 and the wrap-start portion of the overlap wrapping portion 524 may be smaller than one lap, and may be smaller than a half lap.

The number of laps made at the fixed-position wrapping portion 522 is not particularly limited, provided there are two or more laps, and can be set as appropriate. For example, the number of laps made at the fixed-position wrapping portion 522 may be three or more, five or more, and ten or more. The number of laps made at the fixed-position wrapping portion 522 may be set in view of the thickness of the tape T and the finishing thickness of the fixed-position wrapping portion, for example. Specifically, if the thickness of the tape T is 0.1 mm and the finishing thickness of the fixed-position wrapping portion 522 is to be 2.0 mm, the number of laps made at the fixed-position wrapping portion 522 can be set to 20.

The lap margin of the overlap wrapping portion 524 may be set in view of the thickness of the tape T and the finishing thickness (thickness from the inner surface on the wires 12 side to the outer surface) of the overlap wrapping portion 524, for example. Specifically, if the thickness of the tape T is 0.1 mm and the finishing thickness of the overlap wrapping portion 524 is to be 1.0 mm, by employing a 9/10 lap margin, the required finishing thickness of the overlap wrapping portion 524 can be obtained.

Also, the lap margin of the overlap wrapping portion 524 may be set in view of the rigidity of the tape T. That is, if the lap margin is the same in a case where the tape T has high rigidity and a case where it has low rigidity, if the tape T has high rigidity, the supporting force of the second portion in the raised portion increases, and the raised portion is likely to be kept in a raised state. On the other hand, if the tape T has low rigidity, the supporting force of the second portion in the raised portion decreases, and the raised portion is unlikely to be kept in a raised state. If the lap margin is increased, the supporting force of the second portion in the raised portion is increased by a corresponding amount, and the raised portion is likely to be kept in a raised state.

The width of the protruding portion when the overlap wrapping portion 524 has made one full lap is smaller than the finishing thickness of the fixed-position wrapping portion. Thus, the protruding portion of the first lap of the overlap wrapping portion 524 is not adhered to the wires 12. Accordingly, the raised portion formed from the second lap onward of the overlap wrapping portion 524 is likely to be raised away from the wires 12. For example, tape T with a thickness of 0.1 mm and a width of 19 mm is used, and the number of laps of the fixed-position wrapping portion 522 is set to 20 and the lap margin of the overlap wrapping portion 524 is set to 9/10, as described above. The width of the protruding portion once the overlap wrapping portion 524 has made one full lap will be 1.9 mm, which is 1/10 of the width of the tape T. This width is smaller than 2.0 mm, which is the finishing thickness of the fixed-position wrapping portion 522.

Sixth Example of Tape-Wrapping Portion 20

Figure 8:
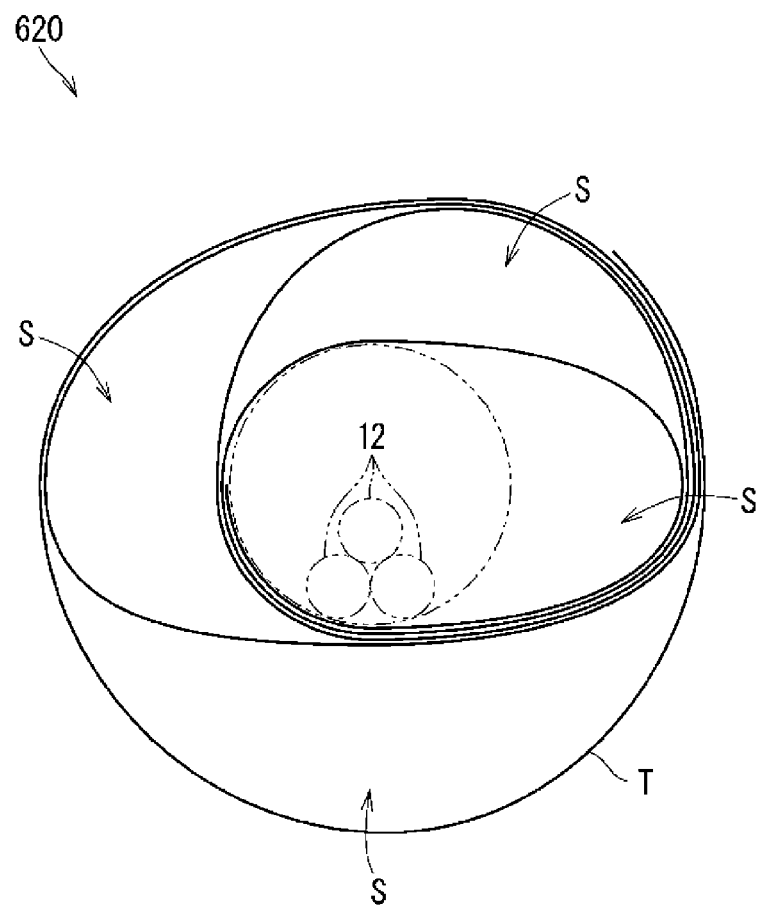
FIG. 8 is a front view showing a sixth example of the tape-wrapping portion.

FIG. 8 is a front view of a sixth example of the tape-wrapping portion 20. Tape T is wrapped in layers in a tape-wrapping portion 620 shown in FIG. 8. Each layer of the tape-wrapping portion 620 is wrapped so as to form a gap S in regions different from each other in the circumferential direction. The tape-wrapping portion 620 will be described below with reference to the manufacturing method of the tape-wrapping portion 620 shown in FIGS. 9 to 12.

Figure 9:
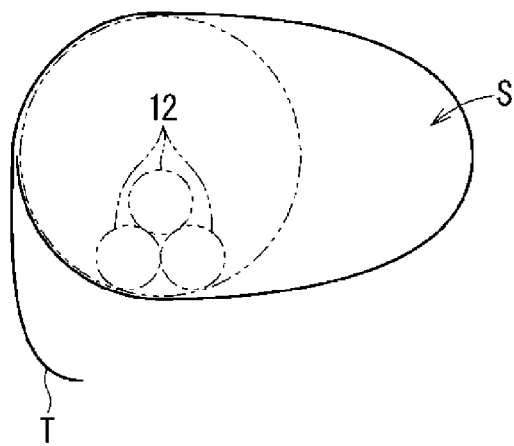
FIG. 9 is a descriptive diagram showing the sixth example of the tape-wrapping portion being manufactured.

FIG. 9 is a descriptive diagram showing a first layer of the tape-wrapping portion 620 being wrapped. The tape T of the first layer is adhered to another region of an adherend (wires 12) on the inner side thereof while leaving a gap S in a region on the right side of the sheet relative to the adherend (wires 12) on the inner side thereof.

Figure 10:
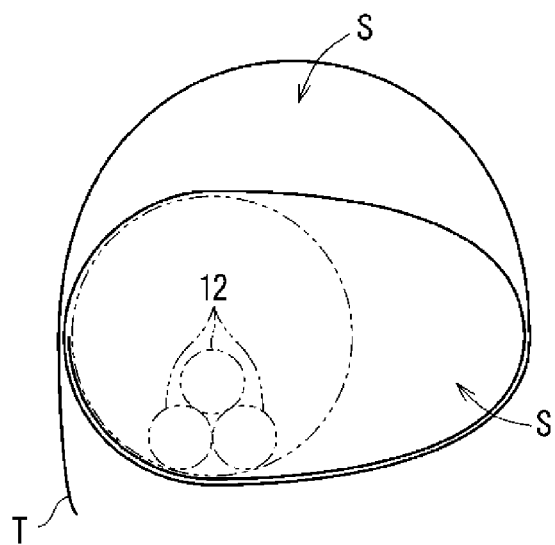
FIG. 10 is a descriptive diagram showing the sixth example of the tape-wrapping portion being manufactured.

FIG. 10 is a descriptive diagram showing a second layer of the tape-wrapping portion 620 being wrapped. The tape T of the second layer is adhered to another region of the adherend (tape T of first layer) on the inner side thereof while leaving a gap in a region on the upper side of the sheet relative to the adherend (tape T of first layer) on the inner side thereof.

Figure 11:
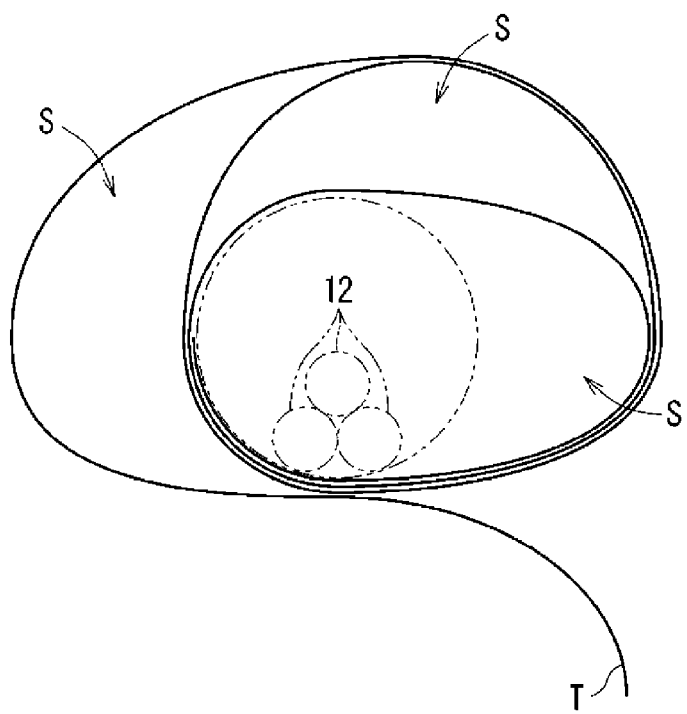
FIG. 11 is a descriptive diagram showing the sixth example of the tape-wrapping portion being manufactured.

FIG. 11 is a descriptive diagram showing a third layer of the tape-wrapping portion 620 being wrapped. The tape T of the third layer is adhered to another region of the adherend (tape T of second layer) on the inner side thereof while leaving a gap in a region on the left side of the sheet relative to the adherend (tape T of second layer) on the inner side thereof.

Figure 12:
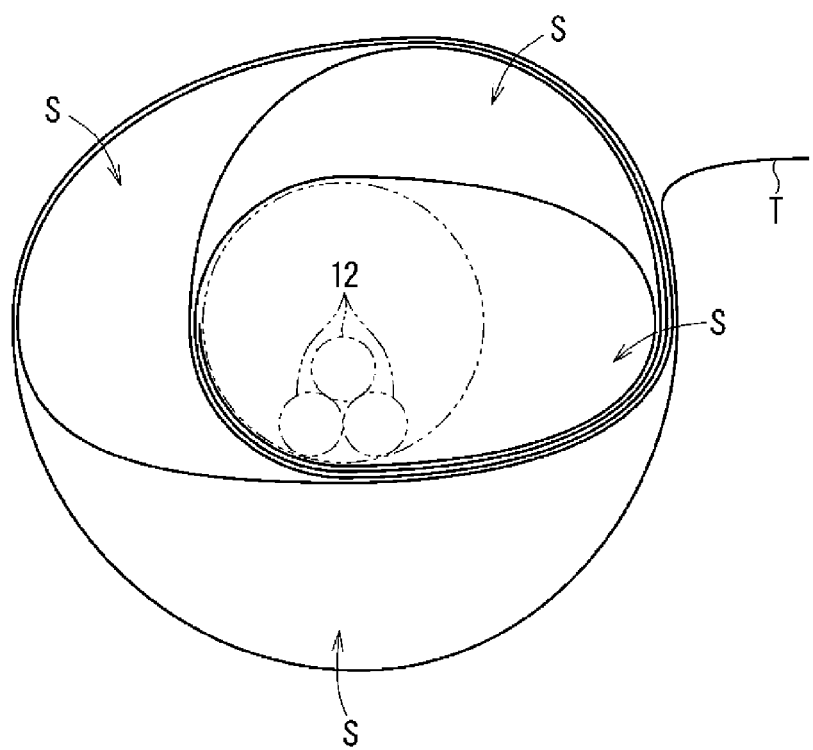
FIG. 12 is a descriptive diagram showing the sixth example of the tape-wrapping portion being manufactured.

FIG. 12 is a descriptive diagram showing a fourth layer of the tape-wrapping portion 620 being wrapped. The tape T of the fourth layer is adhered to another region of the adherend (tape T of third layer) on the inner side thereof while leaving a gap S in a region on the lower side of the sheet relative to the adherend (tape T of third layer) on the inner side thereof.

With the above, a gap S is formed between each layer of the tape T and the adherend on the inner side thereof. Thus, the positions of the gaps S vary between layers. Accordingly, a plurality of gaps S are dispersed along the circumferential direction of the wires 12. Note that, the size of the gap S in each layer is not particularly limited, and can be set as appropriate. For example, the gap S in each layer may be set such that the tape-wrapping portion 620 is almost circular in shape.

Note that, here, an example is described where four gaps S are formed along the circumferential direction of the wires 12, but this is not a necessary configuration. Two gaps may be formed, 3 gaps may be formed, and 5 or more gaps may be formed along the circumferential direction of the wires 12.

Also, this example describes an example where the gaps S are formed in order along the circumferential direction of the wires 12, but this is not a necessary configuration. Four or more gaps S may be formed in an order different from the order of the gaps S following the circumferential direction of the wires 12. For example, similar to the example shown in FIG. 8, when four gaps S are to be formed along the circumferential direction of the wires 12, the two gaps S on the left and right sides of the sheet may be formed first, and then the two gaps S on the upper and lower sides of the sheet may be formed.

Note that the tape T may or may not have rigidity sufficient to maintain the state shown in FIG. 8. If the tape T is not sufficiently rigid to maintain the state shown in FIG. 8, it is also conceivable that the gaps S in this example will collapse. That is, in the example shown in FIG. 8, it is also conceivable that a portion of the tape T forming each gap S will adhere to the adherend on the inner side thereof, and the gaps S will collapse and divide into smaller gaps S.

All examples of the above-described tape-wrapping portion 20 are wrapped using horizontal wrapping. Thus, a vertical wrapping facility is not required. Also, all of the first to sixth examples of the above tape-wrapping portions 20 include spiral wrapping. Thus, a tape-wrapping portion 20 is provided in a region that is longer than the width of the tape T.

Types of Tape

More than one type of tape T may be wrapped around one wire harness 10. Tape T of a first function tape-wrapping portion may be a different type of tape T to the tape T of a second function tape-wrapping portion. As the types of tape T, thick tape, curing tape, foamed resin tape, and fabric tape can be employed, in addition to binding tape. These types of tape T preferably have an adhesive layer. The tape T is fixed to the wires 12 by the adhesive layer.

Here, the binding tape may be tape normally used to bind a wire harness 10. The binding tape may be tape with a thickness of 0.1 mm, for example. The binding tape may be used to exhibit a protective function for protection against nearby metal members. In this case, the binding tape may have more than two layers as shown in the above second to sixth examples, and be wrapped so as to form a gap.

As the thick tape, tape thicker than the binding tape can be used. There is no particular limit on the upper limit of the thickness of the thick tape, provided that it is greater than the thickness of the binding tape. For example, the thick tape may have a thickness less than 0.5 mm and a thickness of 0.3 mm. The thick tape may be used to exhibit the protective function for protection against nearby metal members. In this case the thick tape may be wrapped as shown in the second to sixth examples, in addition to the above first example of the tape-wrapping portion 20. If the thick tape is to be used to exhibit the protective function for protection against metal edges, it is preferable that the thick tape is wrapped to form a plurality of layers.

The curing tape is tape where the base material thereof cures under exposure to ultraviolet rays, heat, water, and the like. The curing tape is cured in a state where the wire harness 10 is attached to a vehicle. It is preferable that the curing tape is cured after being wrapped around the wires 12 in an un-cured state. The curing tape may be used to exhibit the protective function for protection against nearby metal members, in particular, the protective function for protection against metal edges, for example. The curing tape may be used to exhibit the path regulating function, for example. In this case, the curing tape may be wrapped as shown in the second to sixth examples, in addition to the above first example of the tape-wrapping portion 20.

The foamed resin tape is foamed resin tape in which the base material thereof can be easily compressed and restored, such as the case with soft polyurethane foam. The foamed resin tape may be used to exhibit a hitting-sound suppression function, for example. In this case, the foamed resin tape may be wrapped as shown in the second to sixth examples, in addition to the above first example of the tape-wrapping portion 20.

The fabric tape is a tape in which the base material thereof is a fabric cloth. Fibers constituting the fabric cloth are not particularly limited, and may be synthetic fibers, for example. The fabric tape may be used to exhibit the scraping-sound suppressing function, for example. In this case, the fabric tape may be wrapped as shown in the second to sixth examples, in addition to the above first example.

If the tape T of the first function tape-wrapping portion and the tape T of the second function tape-wrapping portion are different types of tape T, the tapes T may be wrapped using the same wrapping method or different wrapping methods.

The wire harness 10 further includes an exterior member. The exterior member is attached to the wires 12. The exterior member is a member different from the one or more types of tape T. In the wire harness 10, only a vehicle fixing member 50 and a grommet 60 are provided as exterior members.

The vehicle fixing member 50 is a member for fixing the wire harness 10 to the vehicle. In the example shown in FIG. 1, a tape clip 50 is used as the vehicle fixing member 50. The tape clip 50 has a locking portion 52 and a plate-shaped portion 54. The tape clip 50 is a resin molded component, for example. The locking portion 52 is formed so as to be able to be inserted and locked to a through hole provided in a panel or the like. The plate-shaped portion 54 is formed in the shape of a flat plate that is elongated in one direction. By wrapping a bundling member 56 such as adhesive tape or a cable tie around the plate-shaped portion 54 and the wires 12 in a state where the longitudinal direction of the plate-shaped portion 54 is along the longitudinal direction of the wires 12, the plate-shaped portion 54 is fixed to the wires 12. Note that, in the example shown in FIG. 1, the locking portion 52 is provided near the center of the plate-shaped portion 54, and bundling members 56 are wrapped around both sides of the locking portion 52. A configuration may be employed where the locking portion 52 is provided near one end portion of the plate-shaped portion 54, and a bundling member 56 is only wrapped on one side of the locking portion 52.

Naturally, there is no need to use the tape clip 50 as the vehicle fixing member 50. A band clip where the above locking portion 52 is formed in one piece with a cable tie or the like may be used as the vehicle fixing member 50. Also, a bracket or the like that has an insertion hole portion into which a stud bolt or the like provided on the vehicle side is to be passed through may be used as the vehicle fixing member 50.

The grommet 60 is a member fitted into a through hole formed in a panel, for example. The wires 12 of the wire harness 10 are passed through the through hole, and arranged spanning a first space and a second space partitioned by the panel. The grommet 60 is a member for suppressing the entry of water and the like between the first and second spaces, and protecting the wires 12 from the circumferential edge portion of the through hole. For example, the first space is a vehicle interior space, and the second space is a vehicle exterior space. The grommet 60 has a large cylinder portion 62 and a small cylinder portion 64. The grommet 60 is made of an elastic material such as rubber or an elastomer.

The large cylinder portion 62 is formed with a larger diameter than that of the through hole in the panel. The outer circumferential surface of the large cylinder portion 62 is provided with a groove 63. The circumferential edge portion of the through hole is accommodated in the groove 63. Accordingly, the large cylinder portion 62 is fitted to the through hole.

The small cylinder portion 64 is continuous with the large cylinder portion 62. The small cylinder portion 64 is fixed to the wires 12. Adhesive tape may be wrapped around an end portion of the small cylinder portion 64 and the wires 12 extending from the end portion of the small cylinder portion 64. The inner surface of the small cylinder portion 64 may press against the wires 12. A water-stopping material may be provided inside the small cylinder portion 64. The water-preventing material fills a gap between the inner surface of the small cylinder portion 64 and the wires 12. The water-preventing material may be an adhesive that adheres to the inner surface of the small cylinder portion 64 and the wires 12 and fixes the two.

The grommet 60 may have a hard resin component, in addition to a component made of an elastic material. In this case, the hard resin component is provided in the component made of an elastic material, for example. An end face of the large cylinder portion 62 provided in the component made of an elastic material is a lip portion that comes into contact with one main surface of the circumferential edge portion of the through hole. Then, a locking protrusion formed in the hard resin component is locked to the other main surface of the circumferential edge portion of the through hole. Accordingly, the grommet 60 is attached to the through hole.

Effects Etc.

With the wire harness 10 configured as described above, as a result of the tape-wrapping portions 20 exhibiting a binding function and an additional function fulfilling the role of a sheet, a tube, or the like, a sheet, a tube, or the like can be omitted. Also, the tape-wrapping portions 20 are provided by wrapping tape. Thus, an exterior portion can be easily provided on the wire harness 10. Note that tape forming the tape-wrapping portions 20 may be wrapped by hand, or automatically by a tape wrapping device or the like. In both cases where the tape forming the tape-wrapping portions 20 is wrapped by hand and wrapped automatically, a sheet, a tube, and the like can be omitted, and thus an exterior portion can be easily provided on the wire harness 10.

The protective function for protection against nearby metal members, the sound-proofing function, and the path regulating function are included as additional functions. Accordingly, an exterior portion that exhibits the protective function for protection against nearby metal members, the sound-proofing function, and the path regulating function can also be easily provided on the wire harness 10.

The plurality of tape-wrapping portions 20 include a first function tape-wrapping portion and a second function tape-wrapping portion, and thus an exterior portion that exhibits a plurality of additional functions can also be easily provided on the wire harness 10. Even though the tape T of the first function tape-wrapping portion and the tape T of the second function tape-wrapping portion are different types of tape T, they are both wrapped using the horizontal wrapping method, and thus the first function tape-wrapping portion and the second function tape-wrapping portion can be easily formed. In this case, the tape T of the first function tape-wrapping portion and the tape T of the second function tape-wrapping portion may be wrapped using exactly the same wrapping method. Accordingly, exterior portions can be easily formed without needing to change the wrapping method.

The plurality of tape-wrapping portions 20 include a first wrapping method portion and a second wrapping method portion, and these tape-wrapping portions 20 having varying functions are provided by one type of tape T.

Only the vehicle fixing member 50 and the grommet 60 are provided as exterior members, and thus exterior components excluding the tape T, the vehicle fixing member 50, and the grommet 60 can be omitted.

Variations

Figure 13:
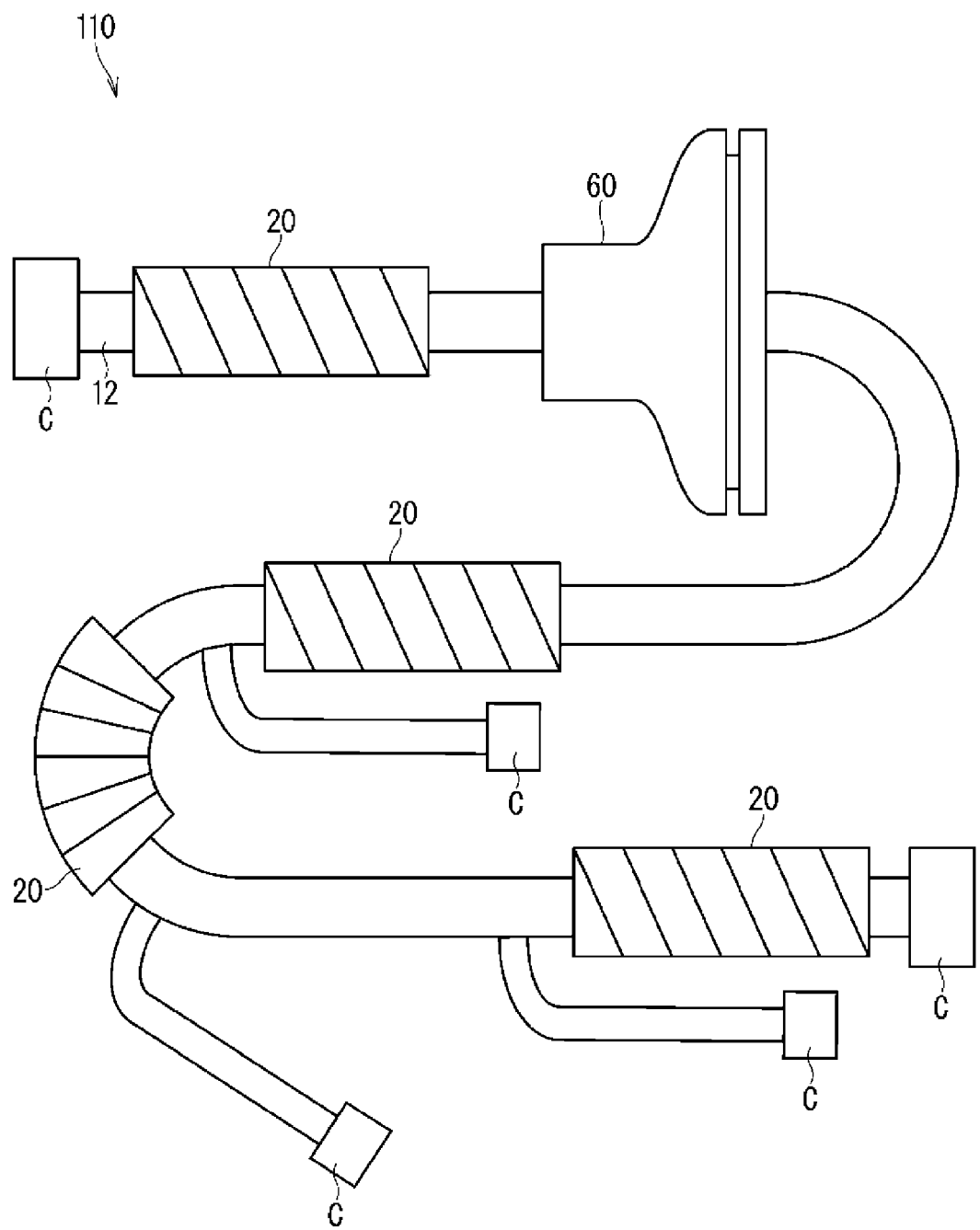
FIG. 13 is a plan view showing a wire harness according to a first variation.

FIG. 13 is a plan view showing a wire harness 110 according to a first variation. In the wire harness 110, only the grommet 60 is provided as an exterior member. Thus, exterior components excluding the tape T and the grommet 60 can omitted from the manufacturing of the wire harness 110.

Figure 14:
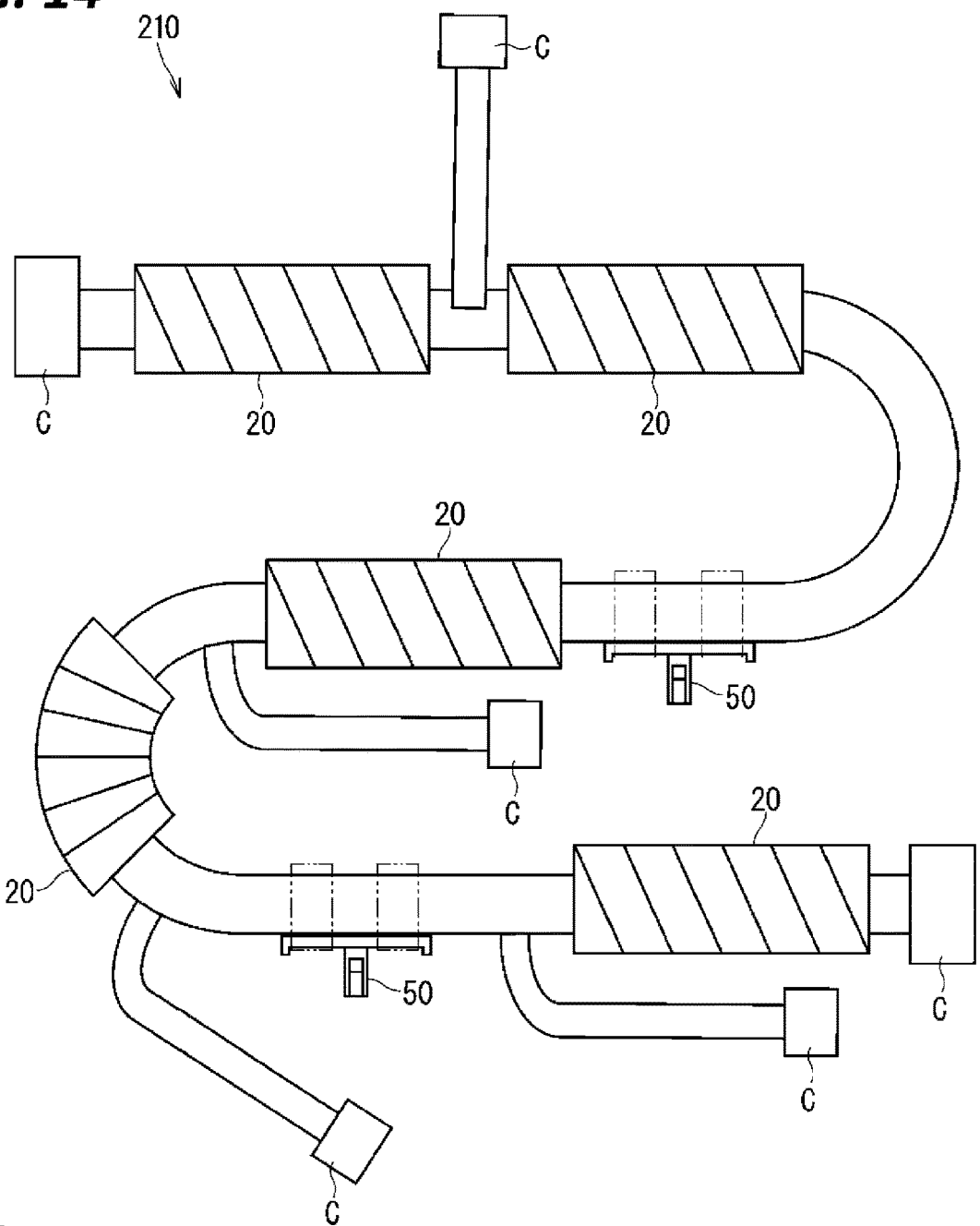
FIG. 14 is a plan view showing a wire harness according to a second variation.

FIG. 14 is a plan view showing a wire harness 210 according to a second variation. In the wire harness 210, only the vehicle fixing members 50 are provided as exterior members. Thus, exterior components excluding the tape T and the vehicle fixing member 50 can be omitted from the manufacturing of the wire harness 210.

Figure 15:
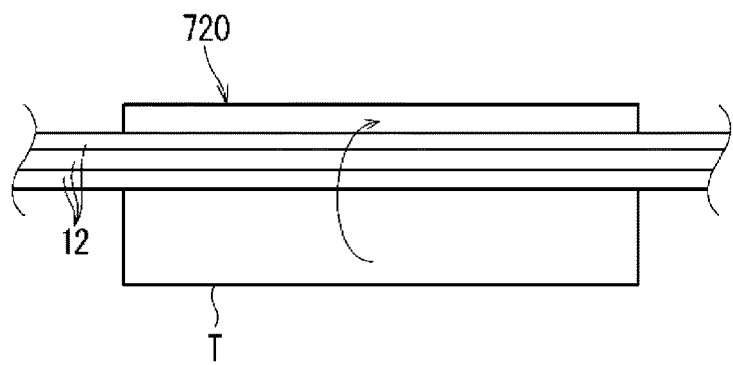
FIG. 15 is a descriptive diagram showing a variation of the tape-wrapping portion.

FIG. 15 is a descriptive diagram showing a variation of a tape-wrapping portion 20. A tape-wrapping portion 720 is a vertical wrapping portion in which the tape T is wrapped vertically. In this case, the tape-wrapping portions 20 of the wire harness 10 may all be vertical wrapping portions. Also, the tape-wrapping portions 20 of the wire harness 10 may include vertical wrapping portions and horizontal wrapping portions.

Note that the configurations described in the above embodiments and variations can be appropriately combined as long as no mutual contradiction occurs.

LIST OF REFERENCE NUMERALS

10 Wire harness
12 Wire
20, 20A, 20B, 20C, 20D, 120, 220, 320, 420, 520, 620, 720 Tape-wrapping portion 22, 522 Fixed-position wrapping portion
24, 524 Overlap wrapping portion
26 Spiral wrapping portion
50 Tape clip (vehicle fixing member)
52 Locking portion
54 Plate-shaped portion
56 Bundling member
60 Grommet
62 Large cylinder portion
63 Groove
64 Small cylinder portion
C Connector
S Space
T Tape

What is claimed is:

1. A wire harness comprising:
a wire; and
one or more types of tape wrapped around the wire,
wherein a plurality of tape-wrapping portions are provided by wrapping the one or more types of tape around a plurality of portions along a longitudinal direction of the wire,
at least one tape-wrapping portion of the plurality of tape-wrapping portions exhibits a binding function and an additional function different from the binding function,
the plurality of tape-wrapping portions include a first wrapping method portion and a second wrapping method portion in which the same type of tape is wrapped using different wrapping methods, and
the first wrapping method portion and the second wrapping method portion are both formed by spiral-wrapping tape using different spiral wrapping methods.

2. The wire harness according to claim 1,
wherein the additional function is at least one selected from a protective function for protection against nearby metal members, a sound-proofing function, and a path regulating function.

3. The wire harness according to claim 1,
wherein the plurality of tape-wrapping portions include a first function tape-wrapping portion that exhibits a first additional function as the additional function and a second function tape-wrapping portion that exhibits a second additional function that is different from the first additional function as the additional function.

4. The wire harness according to claim 3,
wherein tape of the first function tape-wrapping portion and tape of the second function tape-wrapping portion are different types of tape, and
horizontal wrapping is employed as a wrapping method of the tape of the first function tape-wrapping portion and a wrapping method of the tape of the second function tape-wrapping portion.

5. The wire harness according to claim 1,
wherein the first wrapping method portion and the second wrapping method portion are both wrapped around a straight portion, and the first wrapping method portion and the second wrapping method portion are provided at separate portions along the longitudinal direction of the wire.

6. The wire harness according to claim 1, further comprising:
an exterior member attached to the wire,
wherein the exterior member is a different member from the one or more types of tape, and
only a vehicle fixing member and a grommet or only one of the vehicle fixing member and the grommet are provided as the exterior member.

7. The wire harness according to claim 1,
wherein at least one of the first wrapping method portion and the second wrapping method portion is formed by wrapping tape so as to form a gap in the surrounding region of the wire.

8. A wire harness comprising:
a wire; and
one or more types of tape wrapped around the wire,
wherein a plurality of tape-wrapping portions are provided by wrapping the one or more types of tape around a plurality of portions along the longitudinal direction of the wire,
at least one tape-wrapping portion of the plurality of tape-wrapping portions exhibits a binding function and an additional function different from the binding function,
the plurality of tape-wrapping portions include a first tape-wrapping portion and a second tape-wrapping portion formed by wrapping different types of tape to each other, and
the additional function of the first tape-wrapping portion and the additional function of the second tape-wrapping portion is a sound-proofing function, the tape of the first tape-wrapping portion being foamed resin tape and the tape of the second tape-wrapping portion being fabric tape.

9. A wire harness comprising:
a wire; and
one or more types of tape wrapped around the wire,
wherein a plurality of tape-wrapping portions are provided by wrapping the one or more types of tape around a plurality of portions along the longitudinal direction of the wire,
at least one tape-wrapping portion of the plurality of tape-wrapping portions exhibits a binding function and an additional function different from the binding function,
the plurality of tape-wrapping portions include a first tape-wrapping portion and a second tape-wrapping portion formed by wrapping different types of tape to each other, and
the additional function of the first tape-wrapping portion and the additional function of the second tape-wrapping portion is a protective function for protection against nearby metal members, the tape of the second tape-wrapping portion being tape that is thicker than the tape of the first tape-wrapping portion, or the tape of the first tape-wrapping portion being non-curing tape and the tape of the second tape-wrapping portion being curing tape.

* * * * *